US011615216B2

United States Patent
Ang et al.

(10) Patent No.: US 11,615,216 B2
(45) Date of Patent: Mar. 28, 2023

(54) DEPLOYABLE SCREEN PROTECTION STRUCTURE

(71) Applicant: INTERNATIONAL BUSINESS MACHINES CORPORATION, Armonk, NY (US)

(72) Inventors: Ai Kiar Ang, Anchorvale Link (SG); Carlo Gonzales Gagui, Singapore (SG); Rimbun Haryanto, Singapore (SG); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 17/079,567

(22) Filed: Oct. 26, 2020

(65) Prior Publication Data

US 2022/0129594 A1 Apr. 28, 2022

(51) Int. Cl.
G06F 21/84 (2013.01)
G06F 1/16 (2006.01)

(52) U.S. Cl.
CPC .............. G06F 21/84 (2013.01); G06F 1/163 (2013.01)

(58) Field of Classification Search
CPC ..................... G06F 1/163; G06F 21/84; G02B 2027/0174
See application file for complete search history.

(56) References Cited

U.S. PATENT DOCUMENTS

| 6,199,730 B1* | 3/2001 | Chisolm | A44C 5/0053 |
| | | | 224/166 |
| 2016/0198995 A1 | 7/2016 | Yeung | |
| 2016/0274544 A1 | 9/2016 | Counas | |
| 2016/0357324 A1 | 12/2016 | Smith | |
| 2018/0213895 A1 | 8/2018 | Green | |

FOREIGN PATENT DOCUMENTS

| CN | 104317187 A | 1/2015 |
| CN | 106820480 A | 6/2017 |
| CN | 105507672 B | 12/2017 |
| CN | 109102718 A | 12/2018 |
| CN | 210348222 U | 4/2020 |

OTHER PUBLICATIONS

Disclosed Anonymously, "Method and System for a Hand-Interchangeable Smartwatch", https://priorart.ip.com/IPCOM/000262536, IP.com No. IPCOM000262536D, Jun. 9, 2020, pp. 1-5.

* cited by examiner

*Primary Examiner* — Mark Edwards
*Assistant Examiner* — Chayce R Bibbee
(74) *Attorney, Agent, or Firm* — Tihon Poltavets (57) ABSTRACT

An apparatus for a deployable screen protections structure includes a body and a strap of a wearable device, where a display screen is positioned on a top surface of the body. The body also include a protection structure integrated into the strap of the wearable device, wherein the protection structure is deployable over the top surface of the body.

18 Claims, 8 Drawing Sheets

DEPLOYABLE SCREEN PROTECTION STRUCTURE

BACKGROUND OF THE INVENTION

This disclosure relates generally to screen protection for electronic devices, and in particular, to a deployable screen protection structure for electronic devices.

Electronic devices, specifically wearable electronic devices such as smartwatches, include a display screen with a user interface through which a user has the ability to interact with. Instances when the user is not interacting with the smartwatch, the user is not focused on the smartwatch during normal activities, the smartwatch can inadvertently contact a foreign object or surrounding surface. The inadvertent contact can result in damage to the display screen on the smartwatch, which might require repair or replacement.

SUMMARY

One aspect of an embodiment of the present invention discloses an apparatus for a deployable screen protection structure, the apparatus comprising a body and a strap of a wearable device, wherein a display screen is positioned on a top surface of the body. The apparatus further comprises a protection structure integrated into the strap of the wearable device, wherein the protection structure is deployable over the top surface of the body.

Another aspect of an embodiment of the present invention discloses a method for deploying a screen protection structure, the method comprising determining, by one or more processors, base protection settings for activating a protection measure, wherein the base protection settings include a base proximity threshold and a base accelerometer threshold. The method further comprises responsive to initializing the base protections settings, monitoring, by one or more processors, data received from a proximity sensor and an accelerometer associated with a wearable device. The method further comprises responsive to determining data received from the proximity sensor meets the base proximity threshold, activating, by one or more processors, a protection measure, wherein the protection measure includes extending a protection structure over a display screen of the wearable device.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which.

DETAILED DESCRIPTION

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Figure 1A:
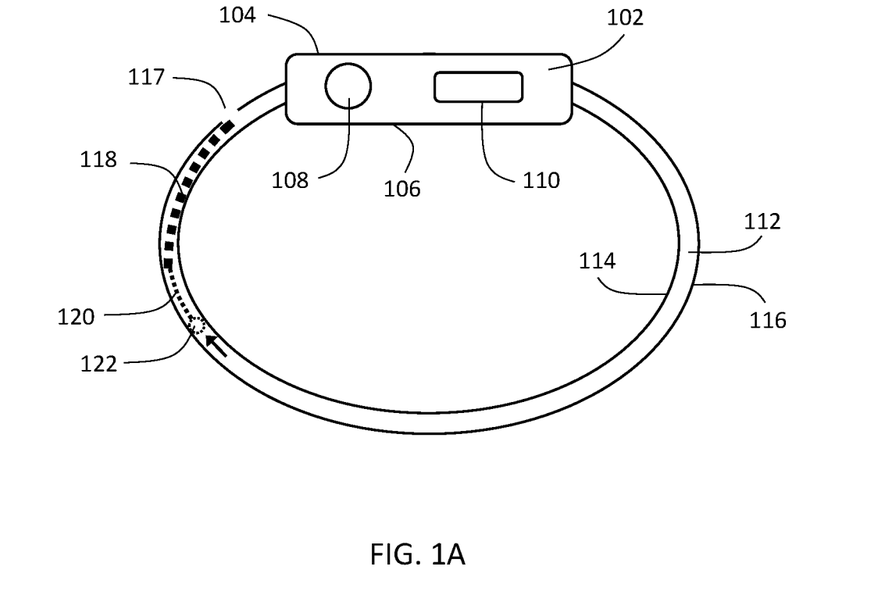
FIG. 1A depicts a side view of a smartwatch with a retracted protection structure, in accordance with an embodiment of the present invention.

FIG. 1A depicts a side view of a smartwatch with a retracted protection structure, in accordance with an embodiment of the present invention. The smartwatch with body 102 represents a wearable electronic device that includes top surface 104 and lower surface 106, where a display screen is positioned on top surface 104. Body 102 also includes crown 108 and selector 110 to allow the user to interact with the smartwatch, where crown 108 and selector 110 can be physical moving buttons and/or haptic feedback buttons. A first end of strap 112 is coupled to a first end of body 102 and a second end of strap 112 is coupled to a second end of body 102. Strap 112 allows for body 102 of the smartwatch to be secured to a user, where lower surface 106 of body 102 and inner surface 114 of strap 112 rest against a wrist of the user wearing the smartwatch. Outer surface 116 of strap 112 represents an exterior surface of strap 112 that includes aperture 117 for extending and retracting protection structure 118. In a retracted state, protection structure 118 is disposed inside a cavity of strap 112 bound by inner surface 114 and outer surface 116, where the cavity can include a guide ramp near aperture 117 for guiding protection structure 118 during extension and retraction. In another embodiment, protection structure 118 is disposed on outer surface 116 of strap 112, where a compartment (not illustrated in FIG. 1A) disposed on outer surface 116 houses protection structure in the retracted state. In yet another embodiment, protection structure 118 is disposed on inner surface 114 of strap, where a compartment (not illustrated in FIG. 1A) disposed on inner surface 114 houses protection structure in the retracted state and protection structure 118 can pass through strap 112 from outer surface 116 to inner surface 114.

A first end of protection structure 118 is coupled to a first end of arm 120, where arm 120 is spring loaded and deformed when disposed inside a cavity of strap 112 between inner surface 114 and outer surface 116. Arm 120 is configured to conform to a curvature of strap 112. Arm 120 is coupled at a second end to mechanism 122, where mechanism can extend and retract protection structure 118 and arm 120 through aperture 117 on outer surface 116 of strap 112. In this embodiment, mechanism 122 represents a one or more motors and one or more gears mechanically coupled to arm 120 for extending and retracting protection structure 118. One or more rails are present in the cavity of strap 112 between inner surface 114 and outer surface 116 for guiding one or more gears of mechanism 122 when one or more motors extends and retracts protection structure 118 and arm 120. In another embodiment, mechanism 122 is spring loaded with an electronically controlled latch for extending protection structure 118 and arm 120, where protection structure 118 and arm 120 are manually retracted by the user of the smart watch until mechanism 122 is spring loaded with the electronically controlled latch.

Figure 1B:
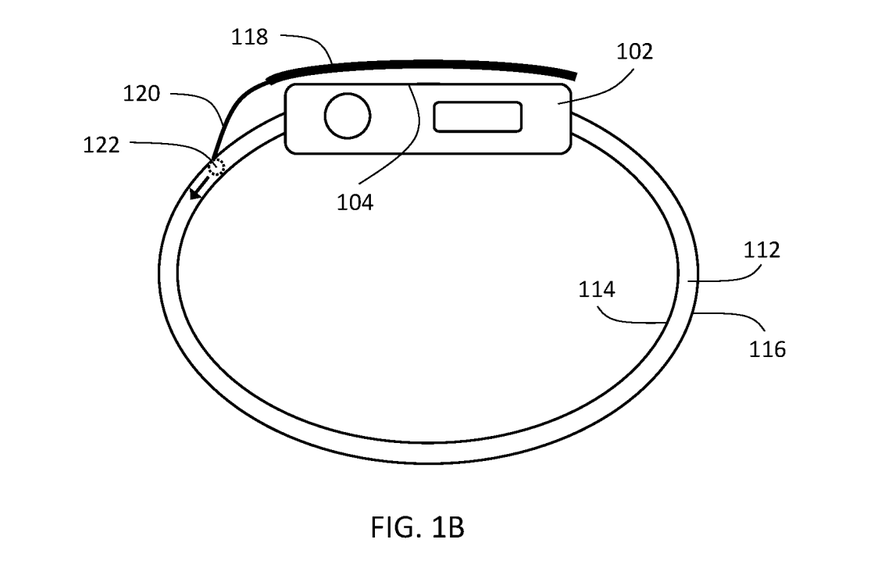
FIG. 1B depicts a side view of a smartwatch with an extended protection structure, in accordance with an embodiment of the present invention.

FIG. 1B depicts a side view of a smartwatch with an extended protection structure, in accordance with an embodiment of the present invention. In an extended state, protection structure 118 is disposed over top surface 104 of body 102 of the smartwatch, where an area of protection structure 118 is at least equal to a surface area of the display screen on top surface 104. Protection structure 118 is positioned over top surface 104 of body 102 to protect the surface area of the display screen from impact due to inadvertent contact with a foreign object and/or a surrounding surface. Protection structure 118 is deformable, such that in a retracted state, protection structure 118 conforms to a curvature of the cavity in strap 112 between inner surface 114 and outer surface 116 and in an extended state, rebounds to shape providing impact coverage to the display screen positioned on top surface 104 on body 102. As previously discussed, arm 120 is spring loaded and deformed when disposed inside a cavity of strap 112 during the retracted state. However, arm 120 is no longer experiencing a load and arm 120 is no longer deformed in the extended state. Arm 120 still retains the spring properties while in the extended state, thus allowing for movement of protection structure 118 when an outer surface of protection structure 118 impacts the foreign object and/or the surrounding surface. An inner surface of protection structure 118 opposite top surface 104 of body 102 can include a deformable material (e.g., foam) to further protect the display screen on top surface 104 when protection structure 118 is pressed into body 102 due to the impact with the foreign object and/or surrounding surface. As the outer surface of protection structure 118 impacts the foreign object and/or surrounding surface, arm 120 compresses and the inner surface of protection structure 118 contacts top surface of 104 of body 102. Mechanism 122 can also move within the cavity of strap 112 to further provide energy absorption when protection structure 119 impacts the foreign object and/or surrounding surface.

Figure 2A:
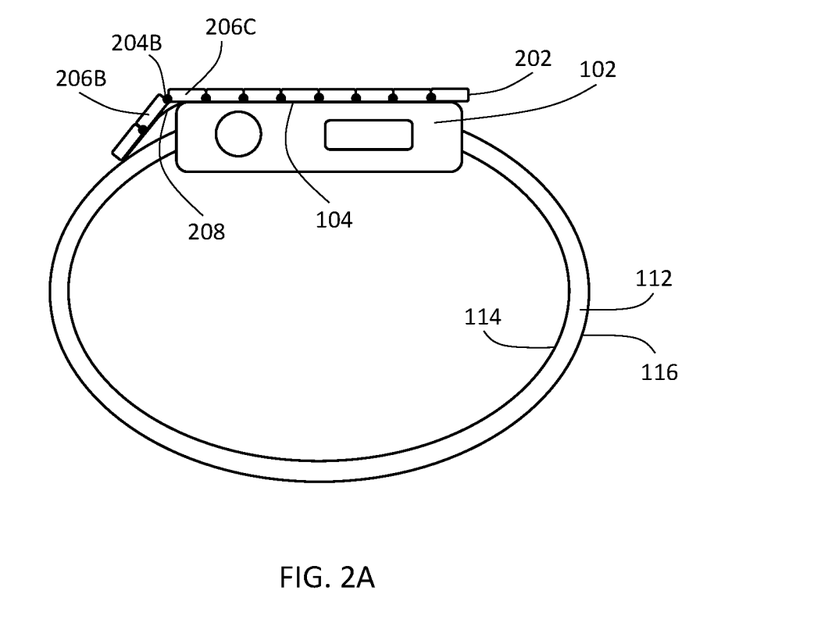
FIG. 2A depicts a side view of a smartwatch with an extended segmented protection structure, in accordance with an embodiment of the present invention.

FIG. 2A depicts a side view of a smartwatch with an extended segmented protection structure, in accordance with an embodiment of the present invention. In an extended state, segmented protection structure 202 is positioned over top surface 104 of body 102 to protect the surface area of the display screen from impact due to inadvertent contact with a foreign object and/or a surrounding surface. In this embodiment, segmented protection structure 202 include ten segments 206 disposed over top surface 104 and guide ramp 208, where each segment 206 is mechanically coupled to at least one hinge 204. Each pair of segments are coupled to one another through a hinge, where a first end of a first segment from the pair is coupled to the hinge and a first end of a second segment from the pair is coupled to the same hinge. Segment 206B is mechanically coupled to segment 206C via hinge 204B, where hinge 204B allows for segment protection structure 202 to conform to a surface created by top surface 104 of body 102 and guide ramp 208. Top surface 104 and guide ramp 208 include at least one guide rail for extending and retracting segmented protection structure 202 from a cavity of strap 112 positioned between inner surface 114 and outer surface 116. Details regarding the at least one guide rail is discussed in further detail with regards to FIG. 2C—2E. An inner surface of each segment 206 of segmented protection structure 202 opposite top surface 104 of body 102 can include a deformable material (e.g., foam) to further protect the display screen on top surface 104 when segmented protection structure 202 is pressed into body 102 due to the impact with the foreign object and/or surrounding surface. An outer surface of each segment 206 of segmented protection structure 202 can include a hardened material (i.e., plastic, metal) to protect against the impact with the foreign object and/or surrounding surface.

Figure 2B:
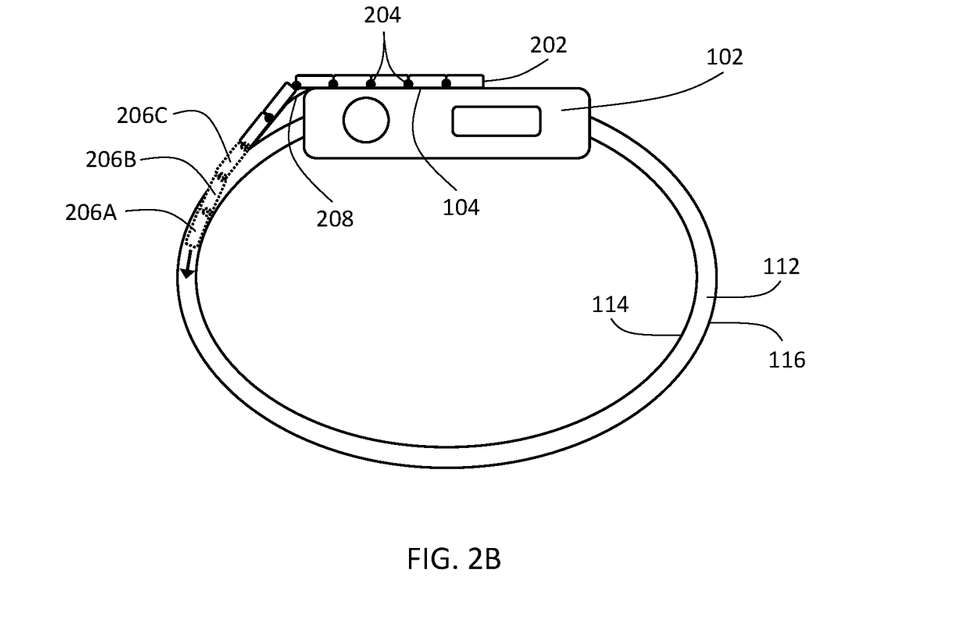
FIG. 2B depicts a side view a smartwatch with a partially retracted segmented protection structure, in accordance with an embodiment of the present invention.

FIG. 2B depicts a side view a smartwatch with a partially retracted segmented protection structure, in accordance with an embodiment of the present invention. In the partially retracted state, segmented protection structure 202 is partially retracted into the cavity of strap 112 positioned between inner surface 114 and outer surface 116, where segmented protection structure 202 retracts into strap 112 via an aperture on strap 112. Segments 206A, 206B, and 206C represent segments of segmented protection structure 202 that are at least partially retracted into strap 112, where a portion of top surface 104 of body 102 becomes exposed in the partially retracted state. In one embodiment, each hinge 204 includes a gear and/or wheel for moving along the at least one guide rail, where segmented protection structure 202 can slide across top surface 104, guide ramp 208, and the cavity of strap 112 during the extension and extraction when transitioning between the extended state and the retracted state. Segment 206A can be coupled to a mechanism to extended and retract segmented protection structure 202 along the at least one guide rail on top surface 104 of body 102 and guide ramp 208. The mechanism can include one or more motors and one or more gears mechanically coupled to segment 206A for extending and retracting segmented protection structure 202. Also, one or more rails are present in the cavity of strap 112 between inner surface 114 and outer surface 116 for guiding one or more gears of the mechanism when one or more motors extends and retracts segmented protection structure 202.

Figure 2C:
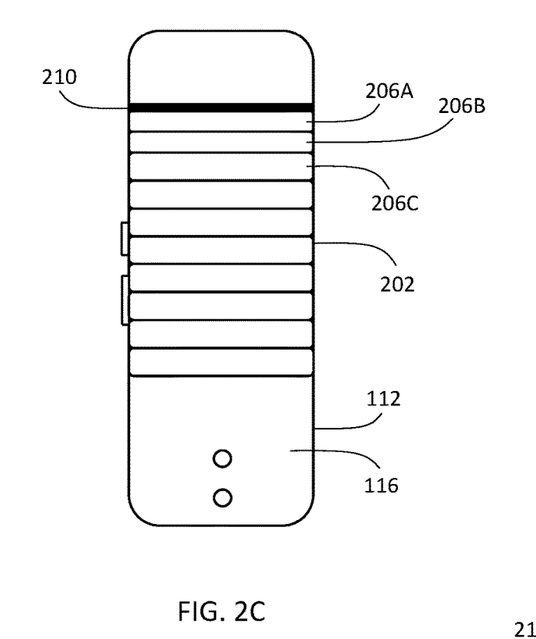
FIG. 2C depicts a top view of a smartwatch with an extended segmented protection structure, in accordance with an embodiment of the present invention.

FIG. 2C depicts a top view of a smartwatch with an extended segmented protection structure, in accordance with an embodiment of the present invention. As previously discussed, in the extended state, segmented protection structure 202 is positioned over top surface 104 (not visible in FIG. 2C) of body 102 (not visible in FIG. 2C) to protect the surface area of the display screen from impact due to inadvertent contact with a foreign object and/or a surrounding surface. Each segment 206 of segmented protection structure 202 includes a width less than a width of aperture 210 to allow for segmented protection structure 202 to extend and retract out of outer surface 116 of strap 112. In this embodiment, each segment 206 of segmented protection structure 202 includes one or more embedded magnets to ensure that segmented protection structure 202 remains pressed against top surface 104 and guide ramp 208 (not visible in FIG. 2C), where each of the one or more embedded magnets of each segment 206 at least partially aligns with one or more rails present of body 102, strap 112, and guide ramp 208. Segment 206C represents a segment that is partially positioned over top surface 104 of body 102 and partially position over guide ramp 208, as previously illustrated in FIG. 2A. Segments 206A and segments 206B each represent a segment that is positioned on guide ramp 208, as previously illustrated in FIGS. 2A and 2B.

Figure 2D:
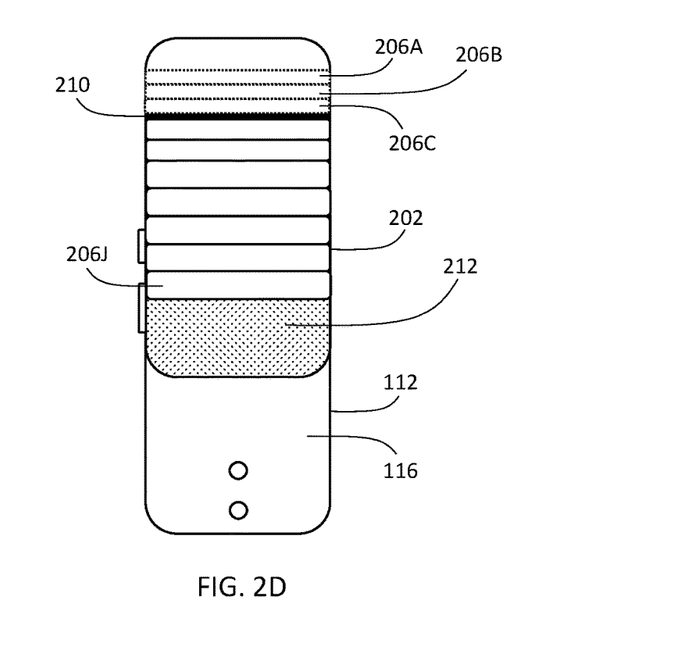
FIG. 2D depicts a top view of a smartwatch with a partially retracted segmented protection structure, in accordance with an embodiment of the present invention.

FIG. 2D depicts a top view of a smartwatch with a partially retracted segmented protection structure, in accordance with an embodiment of the present invention. As previously discussed, in the partially retracted state, segmented protection structure 202 is partially retracted into the cavity of strap 112 positioned between inner surface 114 (not illustrated in FIG. 2D) and outer surface 116, where segmented protection structure 202 retracts into aperture 210 on strap 112. Segment 206A, 206B, and 206 are retracted or at least partially retracted into a cavity of strap 112 through aperture 210 on outer surface 116, where a portion of display screen 212 on top surface 104 (not illustrated in FIG. 2D) is revealed. Beneath display screen 212, one or more magnetic rails are positioned at least in parallel to an extension and retraction movement of segmented protection structure 202 to ensure that each segment 206 of segmented protection structure 202 remains pressed (i.e., mated) against display screen 212. A top surface of display screen 212 and/or a lower surface of each segment 206 of segmented protection structure 202 opposite the top surface of display screen 212, can include a friction reducing coatings (e.g., low coefficient of friction epoxy coating) to ensure a smooth transition between the extended state and the retracted state. In other embodiments, a leading segment 206 (i.e., segment 206J) includes a chamfered edge for clearing a top surface of display screen 212 of debris (e.g., dust or sand particles) as segmented protection structure 202 transitions from the retracted state to the extended state.

Figure 2E:
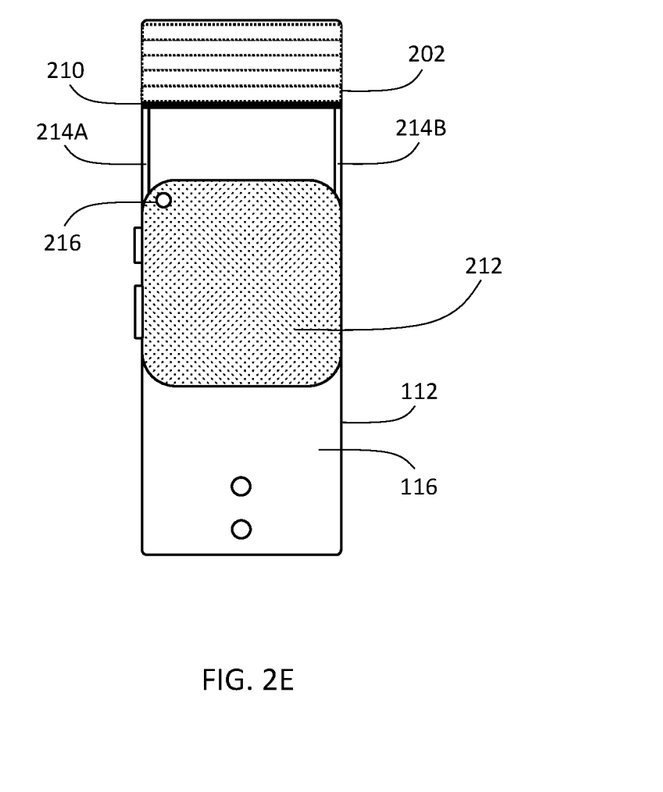
FIG. 2E depicts a top view of a smartwatch with a retracted segmented protection structure, in accordance with an embodiment of the present invention.

FIG. 2E depicts a top view of a smartwatch with a retracted segmented protection structure, in accordance with an embodiment of the present invention. In the retracted state, segmented protection structure 202 is disposed in a cavity of strap 112 between inner surface 114 (not visible in FIG. 2E) and outer surface 116, where a portion of segmented protection structure 202 is not visible or partially visible through aperture 210 of strap 112. Rail guides 214A and 216B represent magnetic strips positioned at least in parallel to an extension and retraction movement of segmented protection structure 202, where a corresponding magnet of each segment 206 of positioned at least in parallel to an extension and retraction movement of segmented protection structure 202 at least partially aligns with rail guide 214A and/or rail guide 214B. In one embodiment, rail guide 214A and 214B are positioned on top of outer surface 116 of strap 112 and are integrated into an aesthetic design of strap 112. In another embodiment, rail guide 214A and 214B are embedded into strap 112, such that rail guide 214A and 214B are not visible on outer surface 116 of strap 112. In the retracted state, display screen 212 is exposed and fully viewable by user of the smartwatch. Proximity sensor 216 positioned on display screen 212 represents a sensor capable of measuring a distance between display screen 212 and a foreign object and/or surrounding surface. A screen protection program utilizes data received from proximity sensor 216 to extend and retract segmented protection structure 202 to protect display screen 212 from the foreign object and/or surrounding surface and is discussed in further detail with regards to FIG. 4.

Figure 3A:
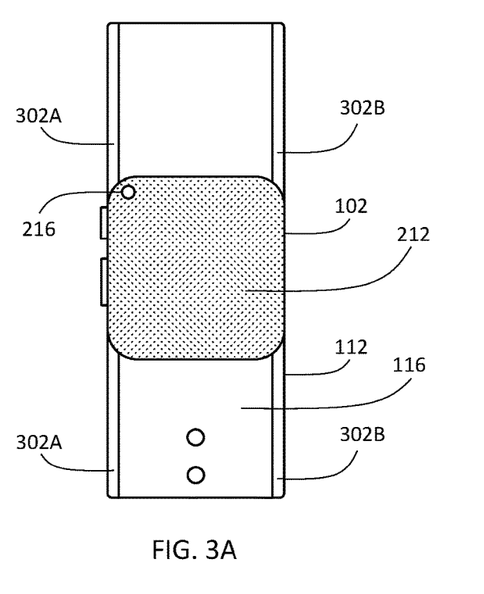
FIG. 3A depicts a top view of a smartwatch with a moveable display screen and rail system in a default position, in accordance with an embodiment of the present invention.

FIG. 3A depicts a top view of a smartwatch with a moveable display screen and rail system in a default position, in accordance with an embodiment of the present invention. In this embodiment, strap 112 includes rails 302A and 302B positioned on each edge of outer surface 116, where lower surface 106 (not visible in FIG. 3A) of body 102 is mechanically and/or magnetically connected to rails 302A and 302B. In one embodiment, each rail 302A and 302B utilizes a plurality of electromagnetics, where each electromagnet is independently activatable. As a result, body 102 has ability to move along rails 302A and 302B to avoid an impact with a foreign object and/or surrounding surface with the activation of the one or more electromagnets on each rail 302A and 302B. In another embodiment, each rail 302A and 302B provides a guide along which a motor mechanism integrated into body 102 can interact with, to move body 102 along outer surface 116 of strap 112.

Figure 3B:
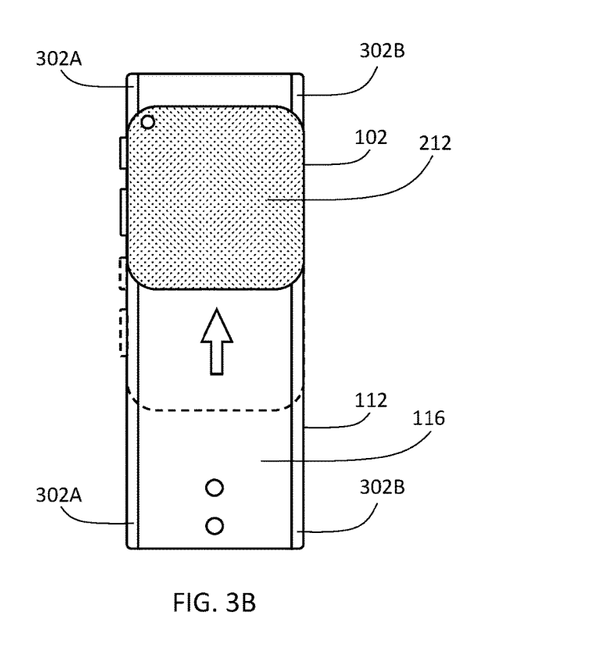
FIG. 3B depicts a top view of a smartwatch with a moveable display screen and rail system in an impact prevention position, in accordance with an embodiment of the present invention.

As previously discussed, proximity sensor 216 positioned on display screen 212 represents a sensor capable of measuring a distance between display screen 212 and a foreign object and/or surrounding surface. A screen protection program utilizes data received from proximity sensor 216 to reposition body 102 along rails 302A and 302B to protect display screen 212 from the foreign object and/or surrounding surface and is discussed in further detail with regards to FIG. 4. In the default position, body 102 is positioned on strap 112 such that a user can interact with display screen 212 to view the time, read a message, accept a phone call etc. It is to be noted, this embodiment described in FIGS. 3A and 3B is combinable with the embodiments described in FIGS. 1A-2E. For example, guide rails 214A and 214B previously described in FIG. 2E can be the same as the rails 302A and 302B described in FIGS. 3A and 3B.

FIG. 3B depicts a top view of a smartwatch with a moveable display screen and rail system in an impact prevention position, in accordance with an embodiment of the present invention. In the impact prevent position, body 102 with display screen 212 has shifted from the default position in FIG. 3A to avoid an impact with a foreign object and/or surrounding surface. In one embodiment, one or more electromagnets on each rail 302A and 302B were activated, resulting in body 102 shifting to a different position on outer surface 116 of strap 112. In another embodiment, an integrated motor mechanism of body 102 was activated, resulting in body 102 shifting to a different position on outer surface 116 of strap 112.

The terminology used herein is for the purpose of describing particular embodiments only and is not intended to be limiting to the invention. As used herein, the singular forms "a", "an" and "the" are intended to include the plural forms as well, unless the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

Figure 4:
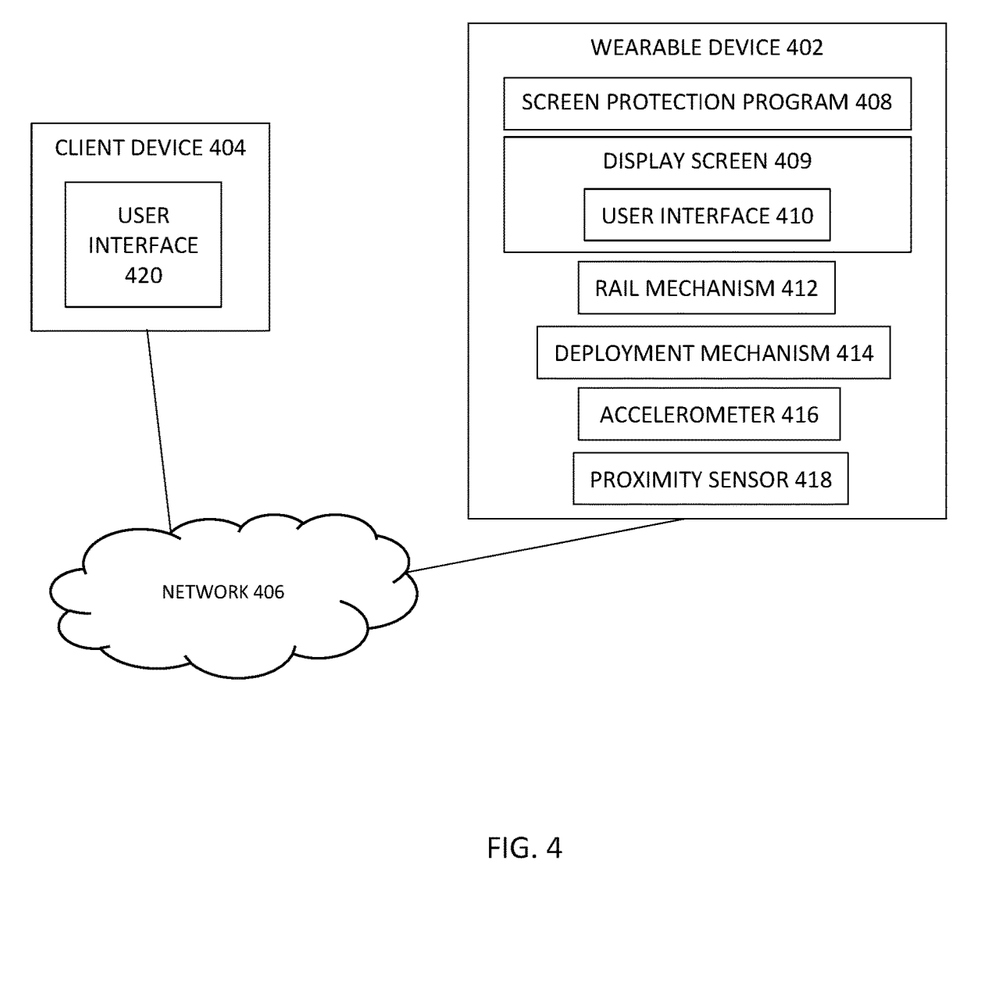
FIG. 4 is a functional block diagram illustrating a distributed data processing environment, in accordance with an embodiment of the present invention.

FIG. 4 is a functional block diagram illustrating a distributed data processing environment, in accordance with an embodiment of the present invention. The distributed data processing environment includes wearable device 402 and client device 404, interconnected over network 406.

Wearable device 402 may be smartwatch device, a fitness tracking device, or any other electronic device wearable by a user and capable of communicating via network 406. In general, wearable device 402 represents one or more programmable electronic devices or combination of programmable electronic devices capable of executing machine readable program instructions and communicating with other computing devices (not shown) within distributed data processing environment via a network, such as network 406. Wearable device 402 includes screen protection program 408, display screen 409, user interface 410, rail mechanism 412, deployment mechanism 414, accelerometer 416, and proximity sensors 418.

Client device 404 may be a cellphone, smartphone, smartwatch, laptop, tablet computer, or any other electronic device capable of communicating via network 406. In general, client device 404 represents one or more programmable electronic devices or combination of programmable electronic devices capable of executing machine readable program instructions and communicating with other computing devices (not shown) within distributed data processing environment via a network, such as network 406. In one embodiment, client device 404 represents one or more devices associated with a user. Client device 404 includes user interface 420, where user interface 420 enables a user of client device 404 to interact with screen protection program 408 on wearable device 402.

In general, network 406 can be any combination of connections and protocols that will support communications between wearable device 402 and client device 404. Network 406 can include, for example, a local area network (LAN), a wide area network (WAN), such as the internet, a cellular network, a Bluetooth® connection or any combination of the preceding, and can further include wired, wireless, and/or fiber optic connections. In one embodiment, screen protection program 408 can be a web service accessible via network 406 to a user of client device 404. In another embodiment, screen protection program 408 may be operated directly by a user of wearable device 402.

Screen protection program 408 has the ability to deploy one or more protection measures to protect display screen 409 of wearable device 402. Screen protection program 408 can determine base protection settings and initialize the protection setting for wearable device 402. Screen protection program 408 can utilizes base protection settings provided by a manufacturer of wearable device or by a user of wearable device 402 via user interface 410. Screen protection program 408 monitors readings for proximity sensor 418 to determine whether a proximity distance threshold has been reached (i.e., possible impact) wearable device 402 and a foreign object and/or surrounding surface. If screen protection program 408 determines a proximity distance threshold has been reached, screen protection program 408 activates one or more protection measures. If screen protection program 408 determines a proximity distance threshold has not been reached, screen protection program 408 monitors readings for accelerometer 416 to determine whether an accelerometer threshold has been reached (i.e., rapid movement) for wearable device 402. If screen protection program 408 determines the accelerometer threshold has been reached, screen protection program 408 activates one or more protection measures. Activating one or more protection measures can include actuating rail mechanism 412 and/or deployment mechanism 414 for deploying a protection structure, a segmented deployment structure, and/or relocating a body of wearable device 402 along a strap of wearable device 402.

Figure 5:
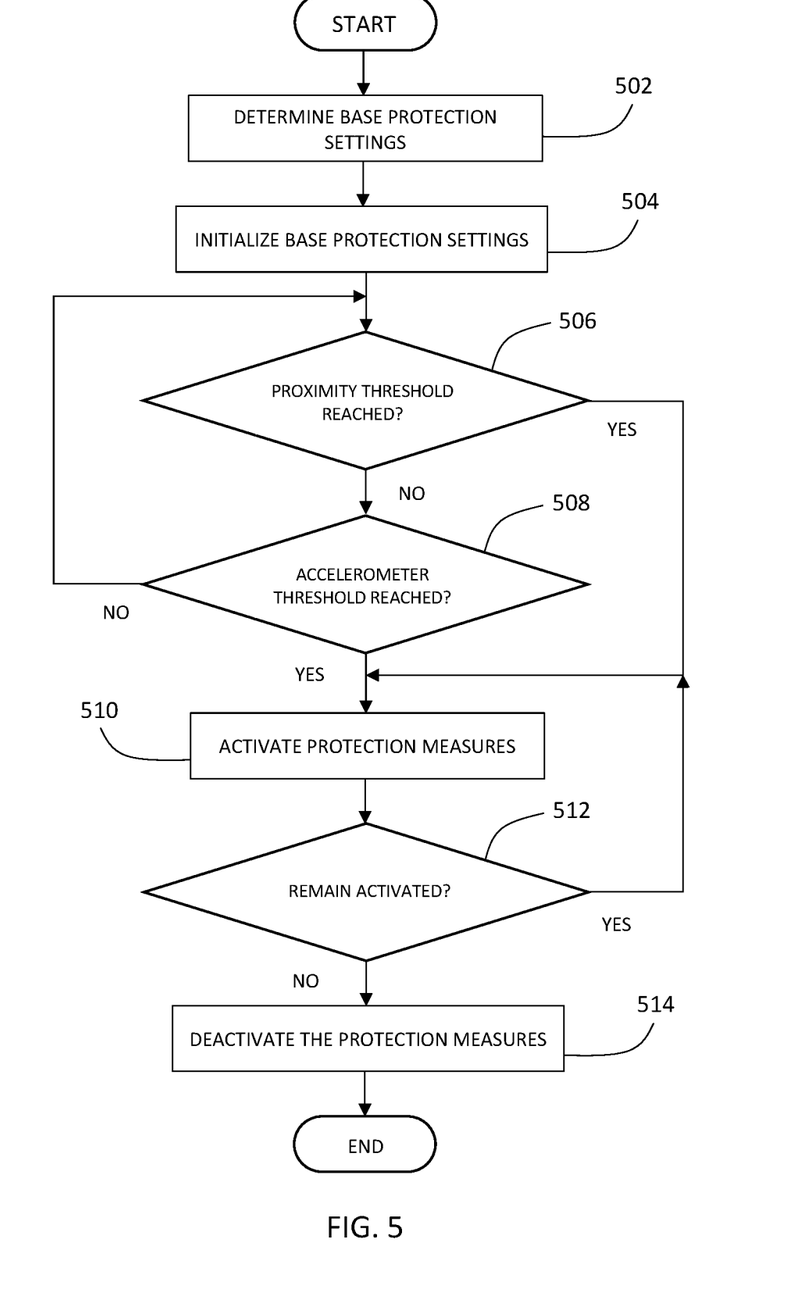
FIG. 5 is a flowchart depicting operational steps of a screen protection program for detecting an event and activating a protection measure, in accordance with one embodiment of the present invention.

FIG. 5 is a flowchart depicting operational steps of a screen protection program for detecting an event and activating a protection measure, in accordance with one embodiment of the present invention.

Screen protection program 408 determines base protection settings (502). Protection settings represent base proximity distance threshold and base accelerometer threshold for activating one or more protection measures to protect a display screen of a wearable device. A proximity distance threshold (e.g., 0.5 meters) represents a measured distance by a proximity sensor on the wearable device and a foreign object and/or surround surface. An accelerometer threshold (e.g., 9.8 m/s$^2$) represents a measured acceleration by an accelerometer on the wearable device that can signifies a rapid motion (e.g., free fall) that can be potentially damaging to the display screen on the wearable device. A manufacture can define the base proximity distance threshold and the base accelerometer threshold, where screen protection program 408 determines to utilize the manufacture defined the base proximity distance threshold and the base accelerometer threshold as the base protection settings. Alternatively, screen protection program 408 allows a user of the wearable device to provide the base proximity distance threshold and the base accelerometer threshold or alter the base proximity distance threshold and the base accelerometer threshold as defined by the manufacture of the wearable device to increase or decrease the sensitivity of activating the one or more protection measures.

Screen protection program 408 initializes base protection settings (504). Screen protection program 408 initializes the base protections settings by monitoring current proximity sensor readings and current accelerometer readings and comparing the current readings to the base proximity distance threshold and the base accelerometer threshold. Screen protection program 408 can utilize machine learning to determine when a user of the wearable device is most active (e.g., 8 AM-6 PM) and increase how often current proximity sensor readings and current accelerometer readings are received. Similarly, screen protection program 408 can utilize machine learning to determine when the user of the wearable device is least active (e.g., 6 PM-8AM) and decrease how often current proximity sensor readings and current accelerometer readings are received, to conserve battery reserves on the wearable device.

Screen protection program 408 determines whether a proximity threshold has been reached (decision 506). In the event screen protection program 408 determines a proximity threshold has not been reached ("no" branch, decision 506), screen protection program 408 determines whether an accelerometer threshold has been reached (decision 508). In the event screen protection program 408 determines a proximity threshold has been reached ("yes" branch, decision 506), screen protection program 408 activates protection measures (510).

Screen protection program 408 determines whether an accelerometer threshold has been reached (decision 508). In the event screen protection program 408 determines an accelerometer threshold has been reached ("yes" branch, decision 508), screen protection program 408 activates protection measures. In the event screen protection program 408 determines an accelerometer threshold has not been reached ("no" branch, decision 508), screen protection program 408 reverts back to monitoring proximity distances between the wearable device and any possible foreign objects and/or surrounding surfaces.

Screen protection program 408 activates protection measures (510). Screen protection program 408 activates one or more protection measures as previously described in FIGS. 1A-2E. In one embodiment, screen protection program 408 activates a mechanism (i.e., mechanism 122 in FIG. 1A) to deploy a protection structure (i.e., protection structure 118 in FIG. 1A) to protect the display screen on the wearable device. In another embodiment, screen protection program 408 activates one or more electromagnets on one or more rails (i.e., rails 214A and 214B in FIG. 2E) to deploy a segmented protection structure (i.e., segmented protection structure in FIG. 2E) to protect the display screen on the wearable device. In yet another embodiment, screen protection program 408 activates one or more electromagnets or motors to reposition a body with the display screen into another position on guide rails (i.e., guide rails 302A and 302B in FIG. 3B) present on a strap of the wearable device. It is to be noted that two or more of the above-mentioned embodiments can be combined by screen protection program 408 when activating the one or more protection measures to protect the display screen on the wearable device.

In other embodiments, an ultrasound scanning sensor is integrated into the smartwatch for identifying any nearby foreign object and/or surrounding surface along an expected movement of the smartwatch and a screen protection program can predict if the smartwatch might impact the foreign object and/or surrounding surface. The screen protection program can activate one or more protection measures that includes deploying protection structure 118, deploying segmented protection structure 202, relocating body 102 along strap 112, and generating a haptic effect (e.g., vibration) on body 102 and/or any type of audio and/or visual signal to alert the user of the expected impact with the foreign object and/or surrounding surface. The screen protection program can further utilize historical learning and predict when there is impact likelihood and a degree of impact to the display screen and accordingly, activating one or more protection measures.

Screen protection program 408 determines whether the protection measures should remain activated (decision 512). In one embodiment, screen protection program 408 utilizes a time-based trigger to determine whether the protection measure should remain activated, where after a predetermined amount of time (e.g., 30 seconds), screen protection program 408 deactivates the protection measures. Screen protection program 408 has the ability to determine when the user intends to interact with the wearable device and deactivates the protection measures, revealing the display screen on the wearable device. In one embodiment, screen protection program 408 can retract the protection structure based on predefined hand and eye focus direction patterns when the user intends to interact with the wearable device. In another embodiment, screen protection program 408 can retract the protection structure subsequent to the accelerometer providing data that signals the user is rotating the wearable device to view the display screen. In yet another embodiment, screen protection program 408 repositions the body on the strap of the wearable device to a position based on predefined hand and eye focus direction patterns when the user intends to interact with the wearable device. Furthermore, screen protection program 408 can track the hand and eye movements of the user and continuously reposition the body on the strap of the wearable device to ensure optimal viewing of the display screen on the wearable device.

In the event screen protection program 408 determines the protection measure should not remain activated ("no" branch, decision 512), screen protection program 408 deactivates the protection measures (514). In the event screen protection program 408 determines the protection measure should remain activate ("yes" branch, decision 512), screen protection program 408 reverts back to (510).

Figure 6:
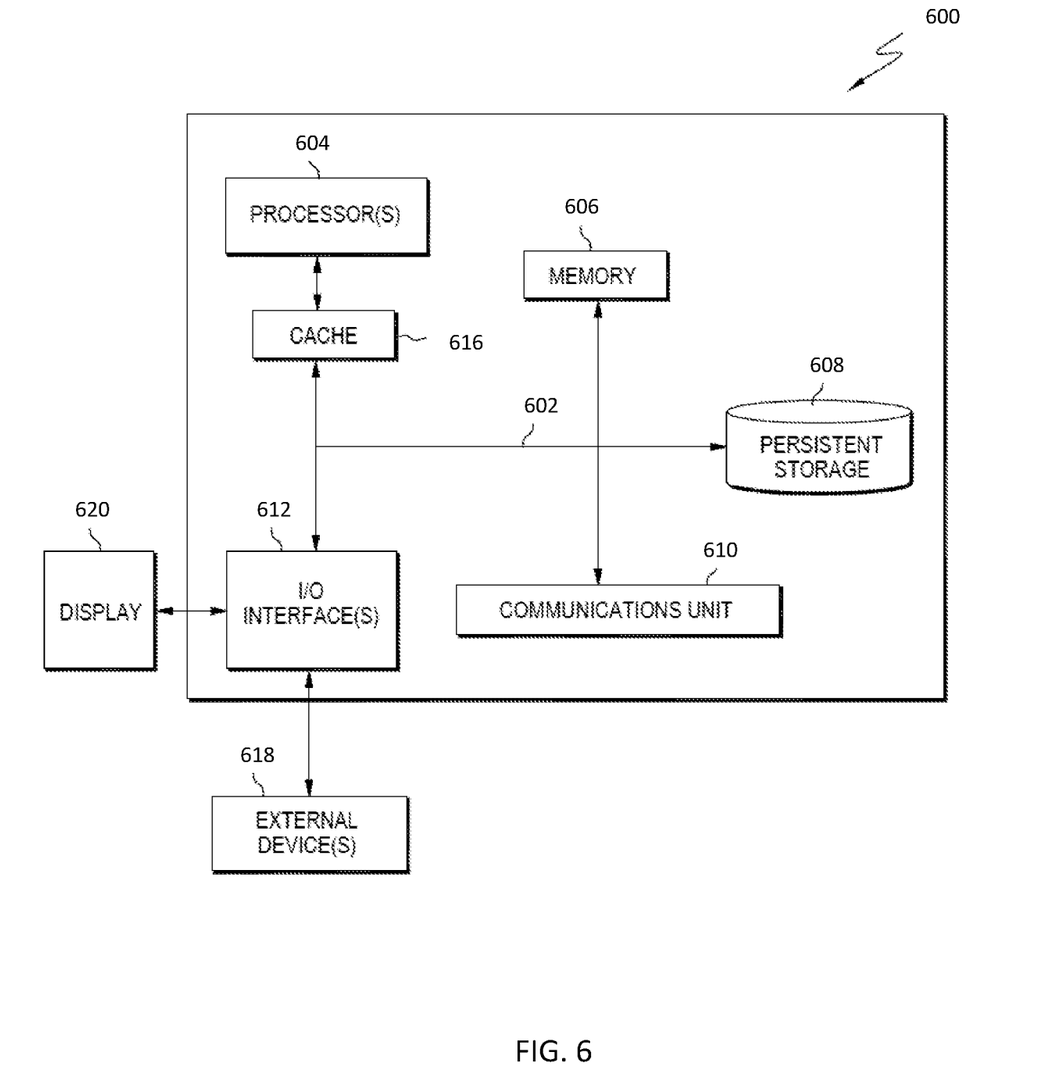
FIG. 6 depicts a block diagram of components of the wearable device executing the screen protection program, in an embodiment, in accordance with the present invention.

FIG. 6 depicts a block diagram of components of the wearable device executing the screen protection program, in an embodiment, in accordance with the present invention. Computer system 600 represents a centralized hub (e.g., wearable device) on which obstruction detection program 500 operates. The computer system includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 602 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 606 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. An apparatus comprising:
a body and a strap of a wearable device, wherein a display screen is positioned on a top surface of the body;
a protection structure integrated into the strap of the wearable device, wherein the protection structure is deployable over the top surface of the body;
a cavity in the strap positioned between an outer surface of the strap and an inner surface of the strap, wherein the protection structure is configured to retract within the cavity in the strap in a retracted state.
2. The apparatus of claim 1, further comprising:
a motor mechanism coupled to an arm and the arm coupled to a first end of the protection structure, wherein the motor mechanism is configured to extend and retract the protection structure from the cavity in the strap.
3. The apparatus of claim 2, wherein the arm is spring load and configured to conform to a curvature of the strap in the retracted state.
4. The apparatus of claim 3, wherein an inner surface of the protection structure includes deformable material and the inner surface of the protection structure is positioned opposite the top surface of the body in an extended state.
5. The apparatus of claim 4, wherein an area of the protection structure is at least equal to an area of the display screen positioned on the top surface of the body.
6. The apparatus of claim 1, further comprising:
a plurality of segments of the protection structure disposed on the top surface of the body in an extended state, wherein a pair of segments from the plurality of segments are coupled to one another through a hinge.
7. The apparatus of claim 6, further comprising:
a guide ramp positioned between the body and an aperture to the cavity in the strap, wherein the protection structure is configured to slide across the guide ramp and the top surface of the body.
8. The apparatus of claim 7, wherein the guide ramp includes at least one guide rail with a magnetic strip positioned at least in parallel to an extension and retraction movement of the protection structure.
9. The apparatus of claim 8, wherein a corresponding magnet of each segment from the plurality of segments of the protection structure at least partially aligns with the at least one guide rail.
10. The apparatus of claim 9, wherein the body and the cavity include the at least one guide rail with the magnetic strip.
11. The apparatus of claim 10, wherein an area of the protection structure with the plurality of segments is at least equal to an area of the display screen positioned on the top surface of the body.
12. The apparatus of claim 11, wherein a lower surface of each segment from the plurality of segments opposite the top surface of the body includes a friction reducing coating.
13. The apparatus of claim 12, wherein the top surface of the body includes the friction reducing coating.
14. The apparatus of claim 9, further comprising:
a motor mechanism coupled to a first segment from the plurality of segments of the protection structure configured to extend and retract the protection structure from the cavity in the strap.
15. The apparatus of claim 9, wherein the protection structure is extendable and retractable through the aperture on the outer surface of the strap.
16. The apparatus of claim 9, wherein a second segment from the plurality of segments opposite the first segment includes a chamfered edge.
17. The apparatus of claim 1, further comprising:
a guide rail positioned on an outer surface of the strap, wherein the body is configured to move along with the guide rail.
18. A method comprising:
determining, by one or more processors, base protection settings for activating a protection measure, wherein the base protection settings include a base proximity threshold and a base accelerometer threshold;
responsive to initializing the base protections settings, monitoring, by one or more processors, data received from a proximity sensor and an accelerometer associated with a wearable device; and responsive to determining data received from the proximity sensor meets the base proximity threshold, activating, by one or more processors, the protection measure, wherein the protection measure includes extending a protection structure over a display screen of the wearable device.

* * * * *